United States Patent
Bechtel et al.

(10) Patent No.: US 6,851,332 B2
(45) Date of Patent: Feb. 8, 2005

(54) CAM LOCK TILT CARTRIDGE

(75) Inventors: Travis D Bechtel, Goodrich, MI (US); William J Elliott, Commerce, MI (US); William A Jolley, Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 160 days.

(21) Appl. No.: 10/290,726

(22) Filed: Nov. 8, 2002

(65) Prior Publication Data

US 2004/0089091 A1 May 13, 2004

(51) Int. Cl.⁷ .................................................. B62D 1/16
(52) U.S. Cl. .......................................... 74/493; 74/492
(58) Field of Search .................... 74/492, 493; 280/775, 280/777

(56) References Cited

U.S. PATENT DOCUMENTS

| | | | |
|---|---|---|---|
| 4,819,498 A | * | 4/1989 | Nishikawa et al. ........... 74/493 |
| 5,265,492 A | | 11/1993 | Snell |
| 5,301,567 A | | 4/1994 | Snell et al. |
| 5,452,624 A | | 9/1995 | Thomas et al. |
| 5,524,927 A | * | 6/1996 | Toussaint ..................... 280/777 |
| 5,566,585 A | | 10/1996 | Snell et al. |
| 5,743,151 A | | 4/1998 | Khalifa et al. |
| 5,823,062 A | | 10/1998 | Snell et al. |
| 6,167,777 B1 | | 1/2001 | Snell |
| 6,591,709 B1 | * | 7/2003 | Kim et al. ..................... 74/493 |

* cited by examiner

Primary Examiner—David M. Fenstermacher
(74) Attorney, Agent, or Firm—Thomas A. Jurecko

(57) ABSTRACT

A cam lock tilt cartridge for a steering column enables the steering column to tilt with respect to an instrument panel. The cam lock tilt cartridge has a housing connected to the steering column. A pawl is rotatably coupled to the housing. A rack is slideably coupled to the housing and connected to the instrument panel. A cam is coupled to both the pawl and rack to move the pawl with respect to the rack to enable movement of the steering column.

6 Claims, 3 Drawing Sheets

CAM LOCK TILT CARTRIDGE

FIELD OF THE INVENTION

The present invention relates to steering systems, and more importantly to a cam lock tilt cartridge for a steering column.

BACKGROUND OF THE INVENTION

Vehicle steering columns are often provided with a tiltable component that enables the steering wheel to be set at varying degrees of tilt according to the desires and needs of different operators. Typically, a manually operable lock mechanism is provided for retaining the steering wheel component in selected positions of tilt adjustment.

There are two known types of manually operable lock mechanisms. One employs a rack and pawl mechanism, and the other is a rotary tilt mechanism. The rack and pawl systems lack the strength of the rotary tilt mechanisms, and both mechanisms require a high degree of precision in component and assembly processing. The high degree of precision required by both of these systems greatly increases piece cost while reducing overall manufacturability.

Accordingly, a need exists for a manually operable lock system with high strength and greater manufacturability.

SUMMARY OF THE INVENTION

The present invention provides a cam lock tilt cartridge for a steering column. The cam lock tilt cartridge enables the steering column to tilt with respect to an instrument panel. The cam lock tilt cartridge has a housing connected to the steering column. A pawl is rotatably coupled to the housing. A rack is slideably coupled to the housing and connected to the instrument panel. A cam is coupled to both the pawl and the rack to move the pawl with respect to the rack to enable movement of the steering column.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
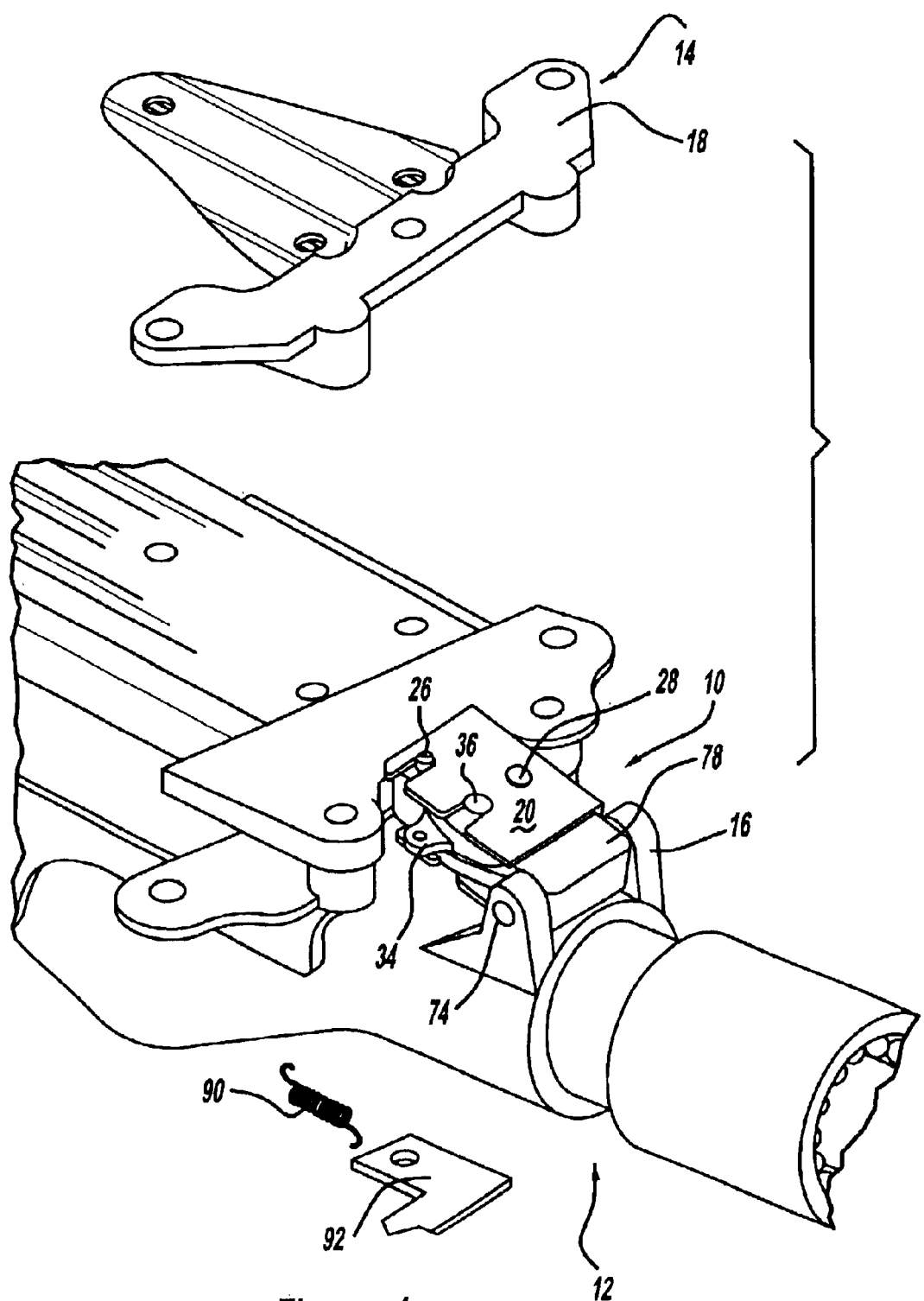
FIG. 1 is a perspective view of a steering column employing a cam lock tilt cartridge according to the principles of the present invention.

Referring to FIG. 1, the present invention is directed to a cam lock tilt cartridge 10 for a steering column 12. The steering column 12 is supported by a fixed surface of a vehicle compartment 14, such as an instrument panel. The steering column 12 includes a bracket 16. The bracket 16 provides a first fixed support for the cam lock tilt cartridge 10 as shown. A bracket 18 on the vehicle compartment 14 serves as a second fixed support for the cam lock tilt cartridge 10. The cam lock tilt cartridge 10 allows the steering column 12 to move with respect to the vehicle compartment 14.

Figure 2:
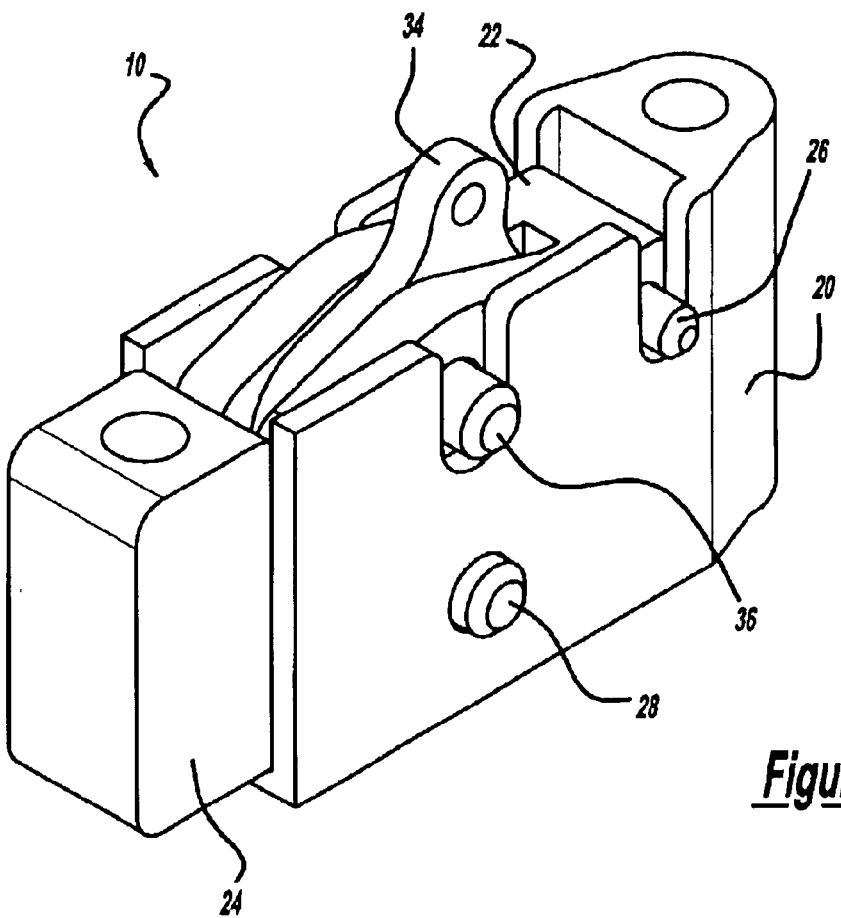
FIG. 2 is a perspective view of the cam lock tilt cartridge of FIG. 1.
Figure 3:
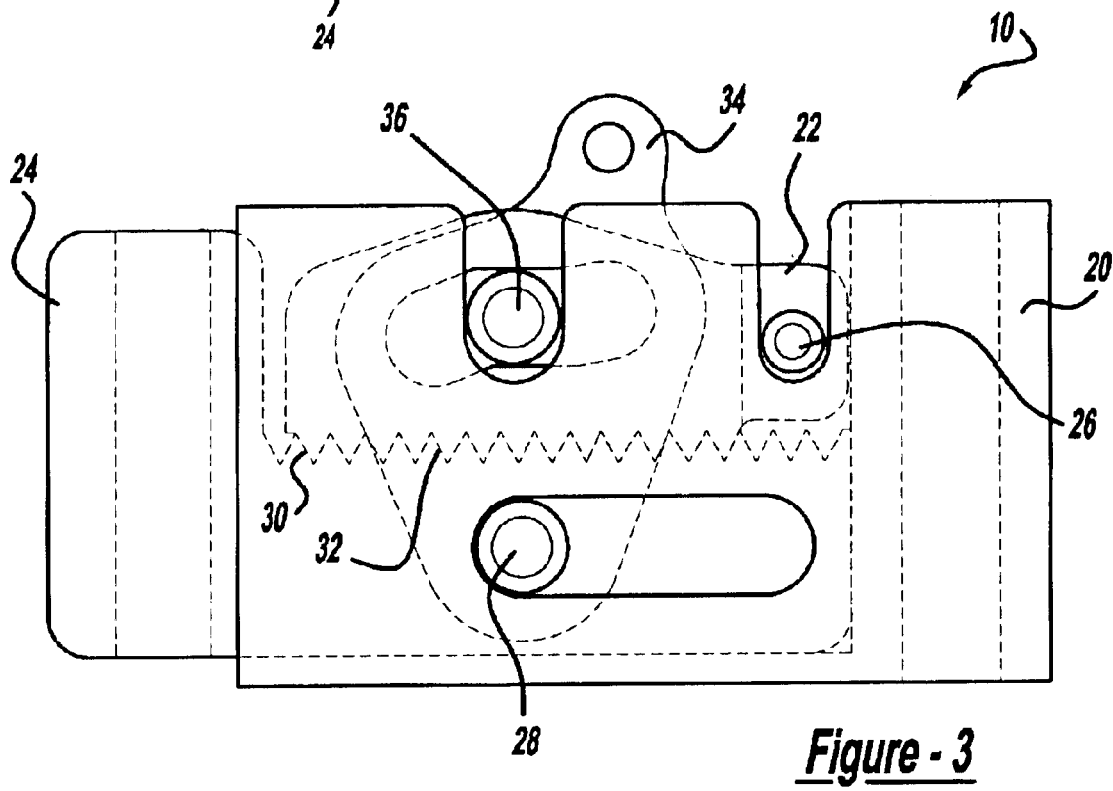
FIG. 3 is a side view of the cam lock tilt cartridge of FIG. 2 with part details shown in phantom.
Figure 4:
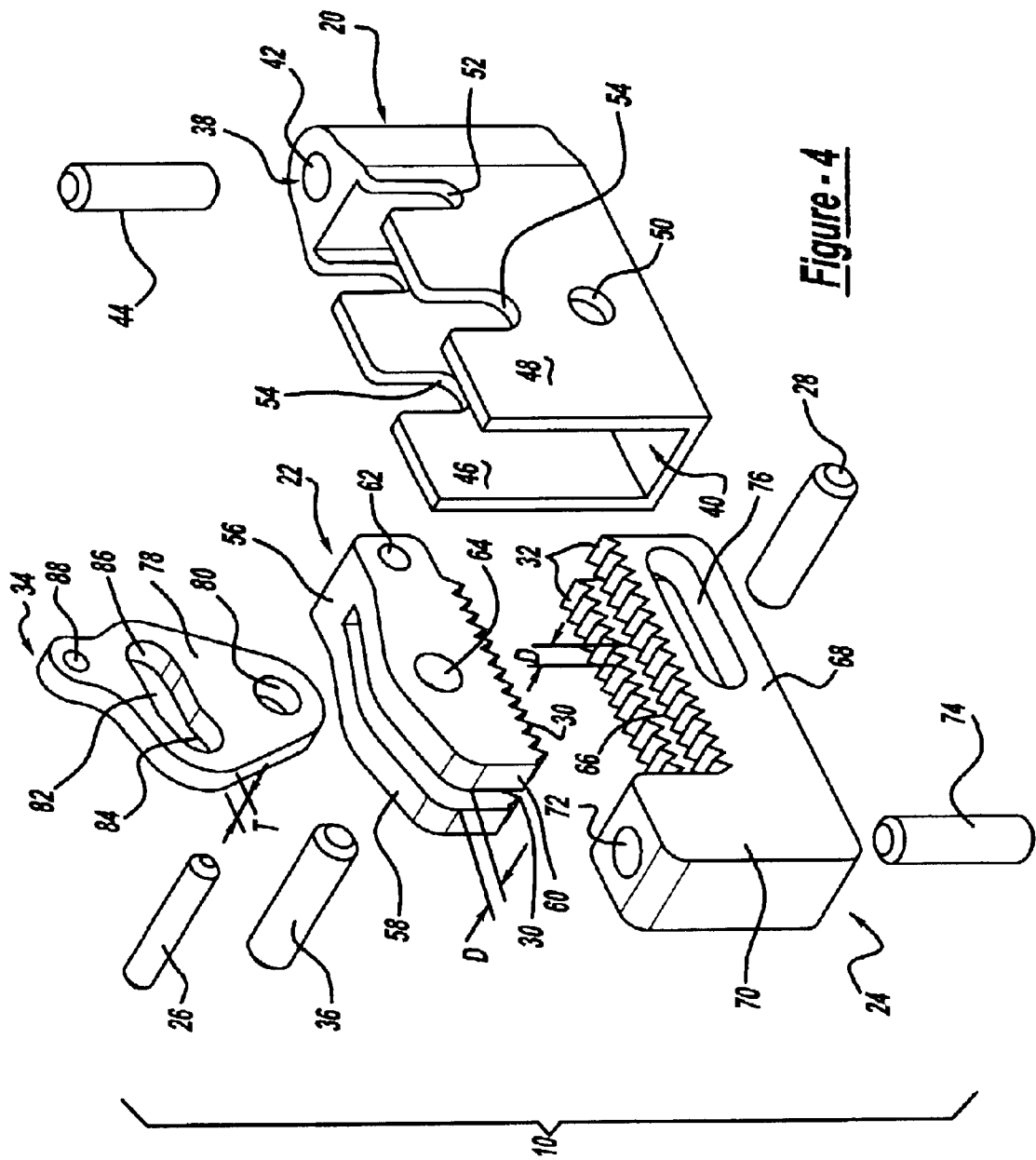
FIG. 4 is an exploded view of the cam lock tilt cartridge according to the principles of the present invention.

With reference now to FIGS. 2–4, the cam lock tilt cartridge 10 is shown. The cam lock tilt cartridge 10 includes a housing 20. The housing 20 supports a pawl 22 and a rack 24. The pawl 22 is coupled to the housing 20 via a first pin 26. A second pin 28 retains the rack 24 in the housing 20. The pawl 22 has a plurality of teeth 30 which interact with a corresponding plurality of teeth 32 on the rack 24. The interaction of the plurality of teeth 30, 32 is controlled by a cam 34. The cam 34 is coupled to the pawl 22 by a third pin 36. The cam 34 is coupled to the rack 24 via the second pin 28.

The housing 20 is generally rectangular with a solid section 38 and a hollowed out section 40 as shown in FIG. 4. The housing 20 may be made from various materials, such as, for example, powdered metal or die cast acuzinc. The solid section 38 has an opening 42 therethrough for receipt of a pin 44. The pin 44 couples the housing 20 to the bracket 18 on the vehicle compartment 14. The hollowed out section 40 supports the pawl 22 and rack 24. The hollowed out section 40 has a first wall 46 and a second wall 48. The first and second walls 46, 48 each define an identical first opening 50 for retaining the rack 24 via the second pin 28. The first opening 50 is sized such that the second pin 28 can be inserted with minimal force. The first and second walls 46, 48 each further define a first open-ended, substantially U-shaped slot 52 for receipt of the first pin 26 with minimal force. A second open-ended substantially U-shaped slot 54 is also defined by the first and second walls 46, 48 for receipt of the third pin 36 with minimal force.

The pawl 22 is coupled to the housing 20 via the first pin 26. The pawl 22 has a main body 56 with a first leg 58 and a second leg 60 extending therefrom. The pawl 22 may be made from various materials, such as, for example, powdered metal or die cast acuzinc. The main body 56 defines an opening 62 for receipt of the first pin 26. The first pin 26 engages the first U-shaped slot 52 of the housing and enables the pawl 22 to pivot with respect to the housing 20. The first and second legs 58, 60 are separated by a distance "D." The distance D is such that the cam 34 can be slideably inserted into slot formed by legs 58, 60. A second opening 64 in legs 58, 60 is for receipt of the third pin 36. Additionally, the first and second legs 58, 60 carry the plurality of teeth 30. The plurality of teeth 30 interact with the rack 24 to lock the steering column 12 into a tilt position.

The rack 24 includes the plurality of teeth 32 which mate with the plurality of teeth 30 of the pawl 22. The plurality of teeth 32 are carried by a first leg 66 and a second leg 68 of the rack 24. The first and second legs 66, 68 extend from a main body 70. The main body 70 defines an opening 72 therethrough for receipt of a pin 74 to connect the rack 24 to the bracket 16 on the steering column 12 (FIG. 1). The rack 24 may be made from various materials, such as, for example, powdered metal or die cast acuzinc. The first and second legs 66, 68 are separated by the same distance "D" as separates legs 58, 60 of pawl 22, such that the cam 34 can be slideably inserted between legs 66, 68. The first and second legs 66, 68 further define a slot 76. The slot 76 is for receipt of the second pin 28. The slot 76 enables the rack 24 to move with respect to the housing 20. The length of the slot 76 corresponds to a desired range of tilt positions.

The cam 34 enables the steering column 12 to tilt with respect to the vehicle compartment 14. The cam has a main body 78. The main body 78 has a thickness "T" which determines the distance D between the first and second legs 58, 60, of the pawl 22 and the first and second legs 66, 68 of the rack 24. The cam 34 may be made from various materials, such as, for example, powdered metal or die cast acuzinc. The main body 78 defines an opening 80 for receipt of the second pin 28. The main body 78 also defines a slot 82. The slot 82 has a first curved section 84 and a second curved section 86 at opposing ends of the slot 82 as shown. The first and second curved sections 84, 86 enable the third pin 36 to move the pawl 22 vertically with respect to the rack 24 to unlock and lock the steering column 12 by engaging or disengaging teeth 30, 32. The main body 78 defines a second opening 88. The second opening 88 provides an attachment point for a spring 90. The spring 90 is coupled to a lever 92. The lever 92 provides the force necessary to slideably rotate the cam 34 in the path defined by the slot 82.

During operation, the lever 92 is pulled toward the driver. The movement of the lever 92 causes the cam 34 to move along the path defined by slot 82 and into the second curved section 86. As the cam 34 moves along the path defined by the slot 82, the pawl 22, being coupled to the cam 34, moves in the path defined by the first U-shaped slot 52 of the housing 20, and the plurality of teeth 30 of the pawl 22 disengage from the plurality of teeth 32 of the rack 24. The driver is then free to move the steering column 12 into a desired tilt position. As the driver is moving the steering column 12, the rack 24 is moving in the path defined by the slot 76. Once the driver is done positioning the column, he releases the lever 92. As the lever 92 is released, the force from the spring 90 causes the cam 34 to move along the path defined by the slot 82 into the first curved section 84, which locks the steering column 12 by moving the pawl 22 to engage the plurality of teeth 30 on the pawl 22 with the plurality of teeth 32 on the rack 24. The same force from the spring 90 causes the cam 34 to move along the path defined by the slot 82 into its original position in the center of the slot 82.

The cam lock tilt cartridge 10 offers high functionality and strength in a small package. Typical cam lock tilt cartridges require high part precision, which greatly increases manufacturing costs and overall part costs. The design of the cam lock tilt cartridge 10 is forgiving with respect to part and process tolerances, thus reducing piece cost. In addition, the cam lock tilt cartridge 10 can be implemented on a variety of different steering columns 12 by modifying the rack 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cam lock tilt cartridge for tilting a steering column in respect to a fixed surface of a vehicle compartment comprising:
   a housing adapted to be coupled to one of the fixed surface and the steering column;
   a pawl rotatably coupled to the housing;
   a rack slideably coupled to the housing and adapted to be coupled to another of the fixed surface and the steering column,
   the pawl and the rack having interengaging surfaces for establishing a plurality of relative positive positions therebetween; and
   a cam coupled to the pawl and the rack such that rotation of the cam causes the interengaging surfaces to disengage, thereby enabling movement of the rack with respect to the housing;
   wherein the pawl includes a main body defining an opening for receipt of a pin which enables the pawl to rotate with respect to the housing and including two legs extending from the main body defining an opening therethrough for receipt of the pin to couple the pawl to the cam and the housing.

2. A cam lock tilt cartridge for tilting a steering column in respect to a fixed surface of a vehicle compartment comprising:
   a housing adapted to be coupled to one of the fixed surface and the steering column;
   a pawl rotatably coupled to the housing;
   a rack slideably coupled to the housing and adapted to be coupled to another of the fixed surface and the steering column.
   the pawl and the rack having interengaging surfaces for establishing a plurality of relative positive positions therebetween; and
   a cam coupled to the pawl and the rack such that rotation of the cam causes the interengaging surfaces to disengage, thereby enabling movement of the rack with respect to the housing;
   wherein the rack includes a first leg and a second leg extending from a main body defining a slot for receipt of a pin which enables the rack to translate with respect to the housing and couples the rack to the cam.

3. A cam lock tilt cartridge for tilting a steering column in respect to a fixed surface of a vehicle compartment comprising:
   a housing adapted to be coupled to one of the fixed surface and the steering column, including a first slot for receipt of opposing ends of a first pin, a second slot for receipt of a second pin, a third slot for receipt of a third pin and a hollowed out portion for receipt of a pawl and a rack;
   the pawl including a main body defining an opening for receipt of the first pin to couple the pawl to the housing, a first leg and a second leg, with the first and second leg extending from the main body, lined with a plurality of pawl teeth and defining a first opening for receipt of the third pin and defining a second opening for receipt of a cam;
   the rack including a main body adapted to be coupled to another of the fixed surface and the steering column, a first leg and a second leg extending from the main body, the first and second legs each lined with a plurality of rack teeth and defining a first opening for receipt of the second pin to slideably couple the rack to the housing and defining a second opening for receipt of the cam; and
   the cam including a main body defining a first opening for receipt of the first pin to couple the cam to the pawl via the second opening of the pawl and defining a second opening for receipt of the second pin to couple the cam to the rack via the first opening of the rack, the first opening of the cam including an elongated portion defining a first end portion and a second end portion such that the first end portion is located at a distance substantially above the elongated portion and the second end portion is located at a distance substantially below the elongated portion;
   wherein the movement of the first pin into the first end portion of the first opening of the cam causes the pawl and rack teeth to disengage, thereby enabling movement of the rack with respect to the housing.

4. The cam lock tilt cartridge of claim 3 wherein the movement of the first pin into the second end portion of the first opening of the cam causes the pawl and rack teeth to engage, thereby preventing movement of the rack with respect to the housing.

5. The cam lock tilt cartridge of claim 3 further including a lever coupled to a spring and the spring coupled to the cam such that when the lever is operated, the spring causes the cam to rotate.

6. The cam lock tilt cartridge of claim 3 wherein the pawl and rack are made of at least one of die cast acuzinc or powdered metal.

* * * * *